Sept. 14, 1948.   C. JOHNSON   2,449,485
GAS ANALYZER

Filed Jan. 1, 1942   3 Sheets-Sheet 1

Inventor
CLARENCE JOHNSON
By Raymond W. Jenkins
Attorney

Sept. 14, 1948. C. JOHNSON 2,449,485
GAS ANALYZER
Filed Jan. 1, 1942 3 Sheets-Sheet 2

Inventor
CLARENCE JOHNSON
By Raymond W. Jenkins
Attorney

Sept. 14, 1948.  C. JOHNSON  2,449,485
GAS ANALYZER
Filed Jan. 1, 1942  3 Sheets-Sheet 3
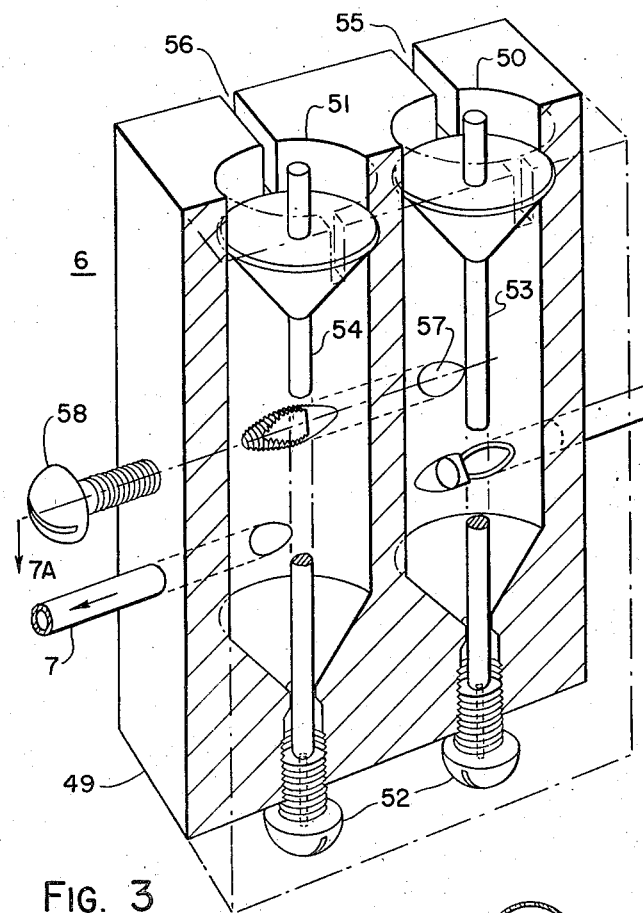
FIG. 3
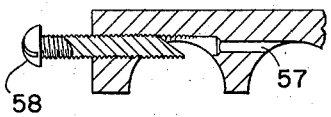
FIG. 7
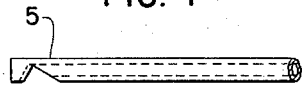
FIG. 8
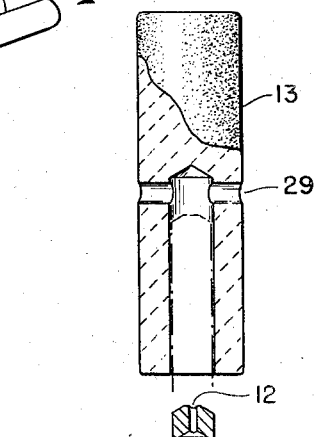
FIG. 4
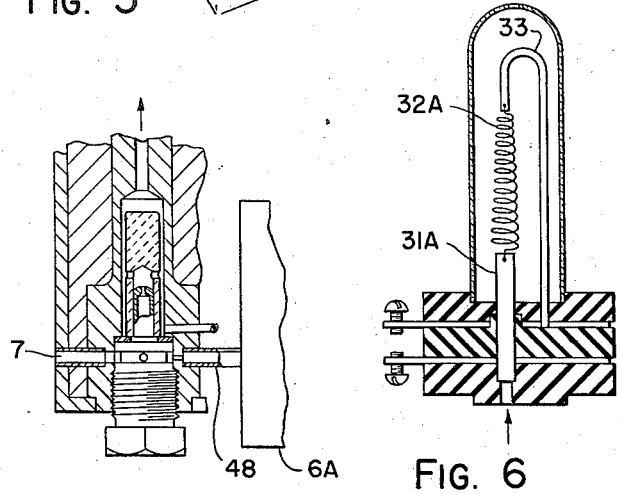
FIG. 5
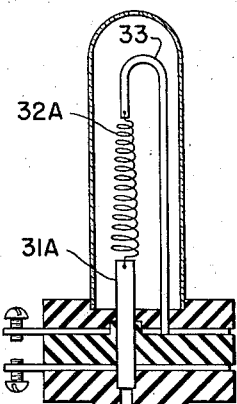
FIG. 6
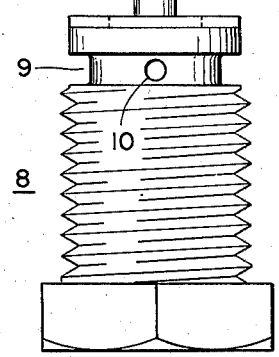
Inventor
CLARENCE JOHNSON
By Raymond W. Junkins
Attorney Patented Sept. 14, 1948

2,449,485

UNITED STATES PATENT OFFICE 2,449,485

GAS ANALYZER

Clarence Johnson, South Euclid, Ohio, assignor to Bailey Meter Company, a corporation of Delaware Application January 1, 1942, Serial No. 425,271

10 Claims. (Cl. 23—255)

This invention relates to a system and apparatus for analyzing gases to determine qualitatively and quantitatively a constituent or constituents of the sample gas stream. More particularly I am concerned with providing an improved means for determining the percent of free oxygen in a flowing gas sample, such as for example a sample stream of flue gas from a combustion process or the exhaust gases from an internal combustion engine.

The particular arrangement which I will describe is directed to the continuous analysis of a flowing sample stream of the gaseous products of combustion from a fuel-fired furnace. Such gases will contain nitrogen, carbon dioxide, free oxygen or excess air, possibly a small amount of carbon monoxide or other unburned combustible, and traces of other gases. I desirably ascertain the percentage of free oxygen and may visually indicate it in terms of free oxygen or in terms of excess air. While I have chosen this particular embodiment as a preferred illustration, it is to be understood that the apparatus and system is broadly adapted to the analysis of a gaseous mixture to determine a constituent or constituents thereof, and is not limited to the analysis for free oxygen only. In other words, certain portions of the apparatus at least are useful in gas analyzing systems for determining the percentage of carbon dioxide, carbon monoxide or other constituents in a gaseous stream.

There are several known methods of continuously analyzing a flowing gas stream to determine a constituent thereof. I have chosen to embody my invention in connection with the method employing catalytic combustion. The catalyst comprises a leg of a Wheatstone bridge adapted to measure the change in electrical resistance of said leg, due to the burning thereon of varying amounts of free oxygen with a supplied fuel.

In order to start the catalytic action it is necessary that the catalytic wire be initially heated to a temperature of approximately 700° F., and this is done electrically. A gaseous mixture is continuously passed over the catalyst and comprises a mixture of a uniform rate-of-flow stream of the sample to be analyzed and a uniform rate-of-flow stream of a gaseous fuel for combining with the free oxygen of the gas sample stream.

It is known that the fuel supplied to such a system may be a gas such as hydrogen, or a vaporized liquid fuel such as methyl alcohol for example. In the present embodiment I utilize a vaporizable liquid fuel of which the vapor is supplied to the analyzing cell at a uniform rate.

Such an analyzing apparatus will be successful and satisfactory only if the gas sample stream and the vapor fuel stream are individually of uniform rate and are thoroughly mixed prior to entering the catalytic combustion chamber. A principal object of the present invention is to provide means for controlling the liquid fuel and its vapor and for controlling the gas sample stream. Other objects will become apparent from a study of the specification and drawings, in which:

Fig. 3 is a phantom perspective drawing of a portion of Fig. 1.

Fig. 4 is an enlarged elevation, partly in section, of a portion of Fig. 1.

Fig. 5 illustrates a slight modification of a portion of Fig. 1.

Fig. 6 illustrates another form of catalytic combustion cell.

Fig. 7 is a section of a portion of Fig. 3.

Fig. 8 is a detail of the conduit 5 of Figs. 1 and 3.

Figure 1:
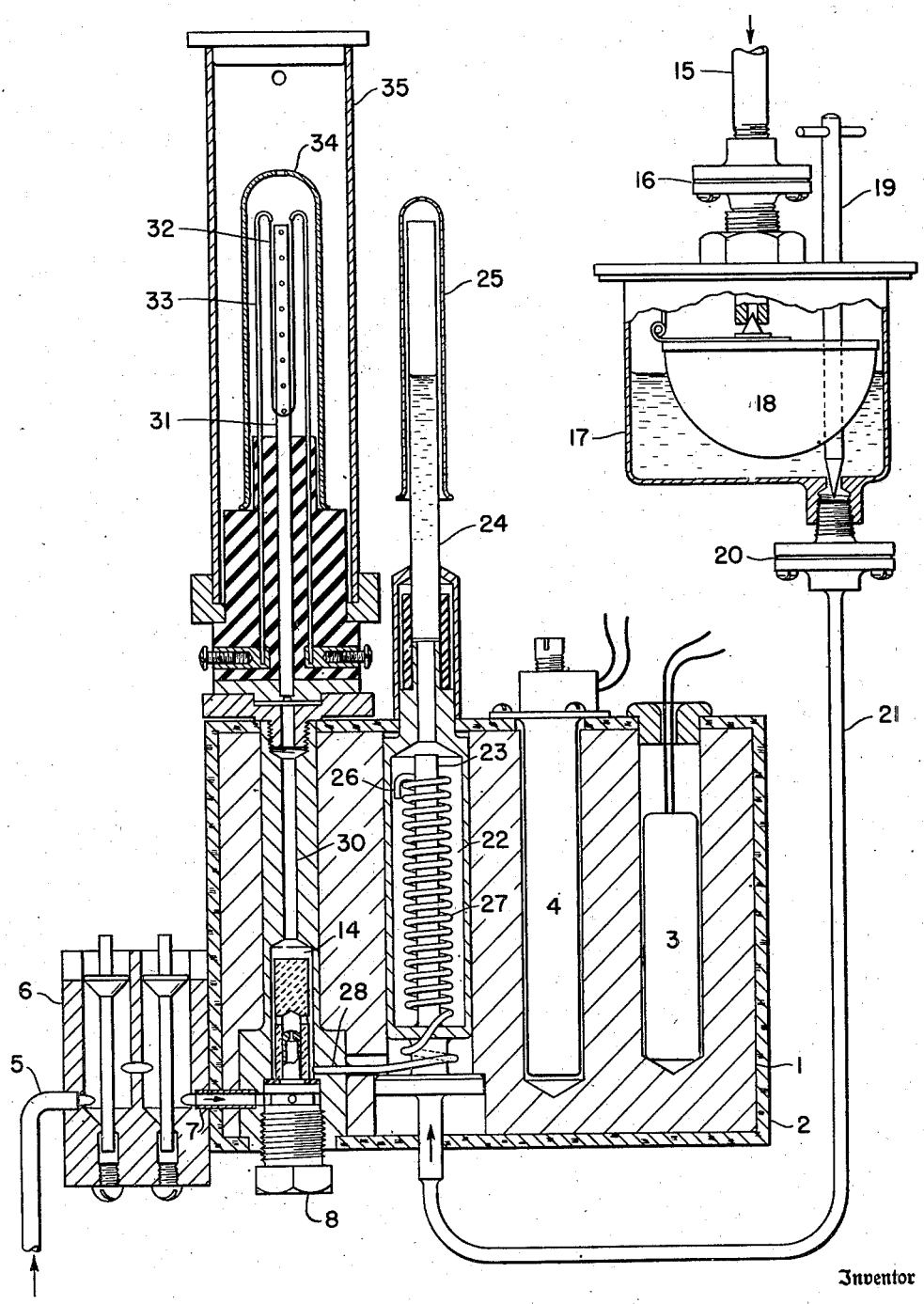
Fig. 1 is a sectional elevation of a preferred embodiment of my analyzer.

Referring now to Fig. 1 in particular, I illustrate therein a sectional elevation of a preferred form of my analyzer construction. The principal body or structure 1 is a block of metal, preferably aluminum, insulated by a cork or other sheathing 2. The assembly is normally continuously heated by an electric heater 3 under the control of a thermostat 4.

A stream of gas to be analyzed is supplied under pressure to the analyzer through a conduit 5. The necessary apparatus for continuously supplying to the conduit 5 a pressure stream of clean sample gas forms no part of the present invention. A satisfactory method and apparatus is disclosed and claimed in the copending application of Hines, Serial No. 406,838, now Patent 2,356,845. It is sufficient to say that desirably a continuous stream (hereinafter termed the sample) is supplied under pressure, and that the sample is representative of the main body of gaseous products of combustion which it is desired to sample and analyze for a constituent thereof.

The sample arriving at the analyzer through the conduit 5 enters a flow regulator 6, which is shown in greater detail in Fig. 3, and which will be hereinafter specifically described and claimed. Suffice it to say here that the sample in passing through the regulator assembly 6 emerges through a duct 7 at a substantially uniform pressure and rate of flow to enter an annular channel 9 (refer to Fig. 4) of a member 8. The member 8 is provided with one or more holes 10 leading from the annulus 9 to a center passage 11 having an exit orifice 12. It is thus clear that a uniform pressure flow of the sample gas, controlled by the regulator 6, will be discharged through the orifice 12 to the interior of a porous stone vaporizer 13, which rests by gravity as a shroud to the projection of member 8 containing the passage 11 and the orifice 12.

As clearly evident in Fig. 1, the member 8 is assembled in the analyzer so that the annulus 9 is aligned with the duct 7 and that the porous stone vaporizer 13, resting by gravity upon the member 8, is retained in a substantially vertical position in a mixing chamber 14.

As a preferred fuel for combustion of the free oxygen I supply a vaporizable liquid fuel, such as methanol or methyl alcohol, in liquid form. The liquid may be in any sort of a container feeding by gravity through the pipe 15 and a filter 16 to a float chamber 17 containing the float 18. The rate of discharge from the float chamber 17 is regulated by a hand adjustment 19 in a passage leading through a filter 20 to a supply pipe 21 leading to the analyzer assembly 1.

The liquid fuel flows by gravity from the pipe 21 to a chamber 22 from the open upper end of a standpipe 23 extension of the pipe 21. Filling the chamber 22 the liquid rises in a glass sight tube 24 open at its top to the atmosphere and loosely capped by a dust seal 25. The level in the sight tube 24 is the same as the liquid level in the float chamber 17 and remains substantially constant. From the chamber 22 the liquid enters the open end 26 of a coil 27 of small capillary connected at its lower extremity 28 to discharge into the mixing chamber 14 adjacent the porous stone vaporizer 13.

The arrangement just described provides a deaerator and liquid fuel rate control. The chamber 22 and the liquid fuel contained therein is uniformly and continuously heated, by means of the heater 3, to a temperature slightly below the vaporization temperature of the liquid but high enough to liberate any air with which the liquid may be saturated. Such liberated air finds its way upward through the sight tube 24 to the atmosphere.

The rate of supply of vaporizable liquid fuel through the discharge 28 (to the mixing chamber 14) is controlled by a combination of the liquid head vertically between the discharge 28 and the liquid level in the tube 24 and the flow restricting capillary 27 through which the liquid must pass from the chamber 22 on its way to the discharge 28. This combination of head and capillary restriction is designed to regulate the rate of liquid flow leaving the exit 28 to a flow rate proportioned to the gas sample entering the mixing chamber through the orifice 12. It is apparent that the length of capillary 27 is fixed when manufactured and that only the head of liquid provides a variable adjustment of the rate of liquid flow through the discharge 28. I may provide means whereby the float chamber 17 is vertically adjustable to vary the head effective at the point 28 for the calibration of individual analyzers.

Liquid fuel leaves the discharge 28 to the lower end of mixing chamber 14 against and around the porous stone vaporizer 13. Capillary attraction saturates the vaporizer 13 for a portion of its vertical length. The sample gas leaves the orifice 12 to the interior of the vaporizer 13, passes therefrom through radial passages 29, through the mixing chamber 14 around the upper portion of the vaporizer 13 and to the exit channel 30. The sample gas contacts the interior and exterior of the vaporizer 13, vaporizing the liquid with which the stone 13 is saturated and thoroughly mixing therewith. This wiping vaporizing action regulates the vertical height on the porous stone 13 which is saturated or partially saturated with liquid. Obviously it is not desired that the chamber 14 be flooded with liquid fuel and a control of the vertical head of liquid available at the discharge 28 regulates the height on the stone 13 which is wet relative to the portion which is substantially dry or wiped free of liquid.

Inasmuch as the sample gas and the liquid fuel both pass through channels in the heated metallic block 1 to a mixing chamber and vaporizer which is also contained in the block 1, there will be an equilibrium temperature attained for the sample gas, the liquid fuel and the mixture of gas and vapor fuel passing through the exit channel 30 to the analyzer cell. The sample gas flow and the liquid fuel flow are individually regulated to a uniform rate of flow and in proper proportionality to each other.

The mixture of sample gas and fuel vapor passing upwardly through the exit channel 30 enters a diffuser tube 31 having a plurality of minute openings adjacent the catalytic wire 32 which is suspended from conductor posts 33. The analyzer cell is loosely housed by a glass or similar cylinder 34 having an exit to its top for the discharge of products of combustion from the catalytic burning on the wire 32. Surrounding the cell is a metallic protection tube 35.

Figure 2:
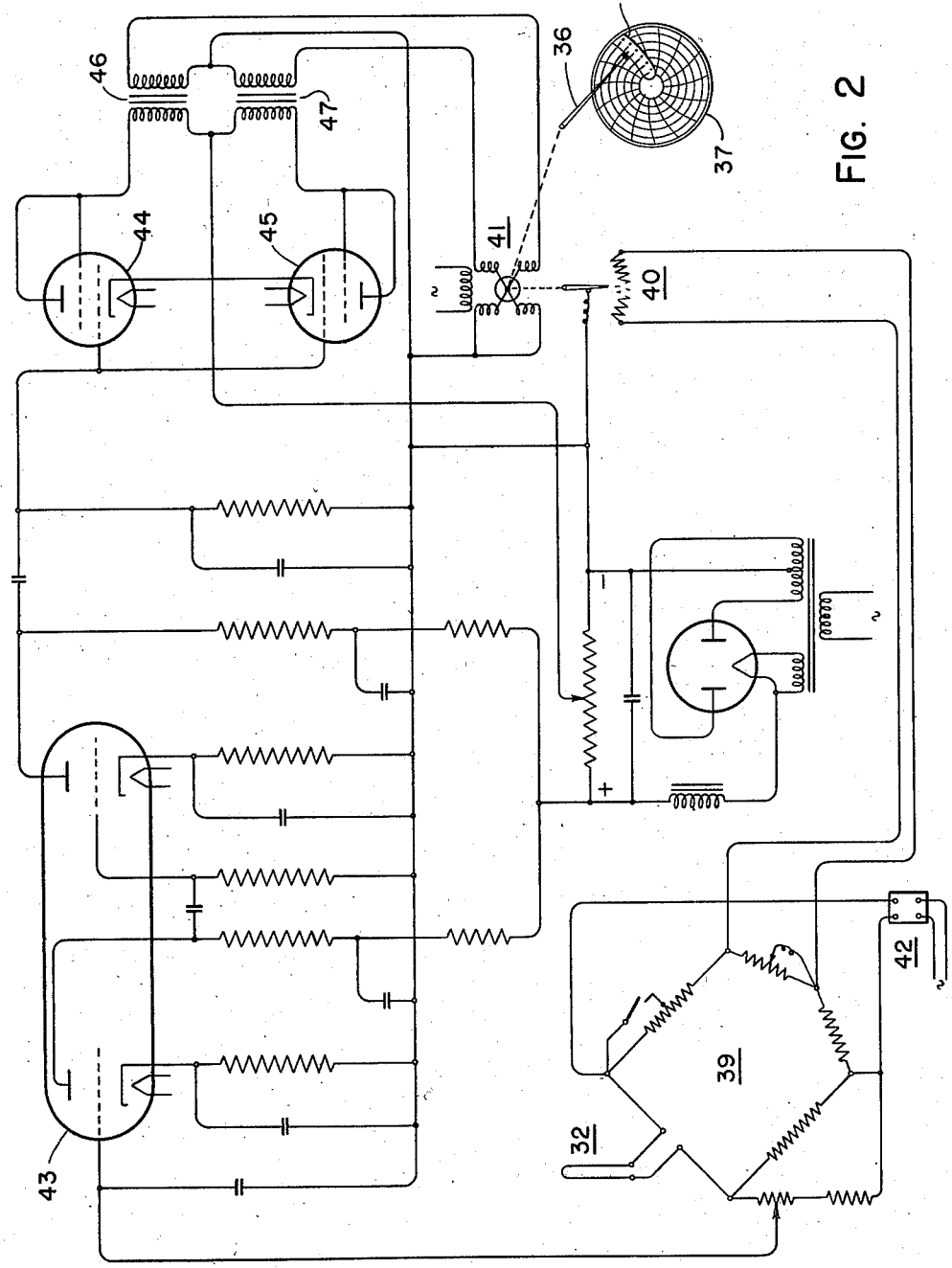
Fig. 2 is a diagrammatic wiring diagram of an analyzer-recorder.

Referring now to Fig. 2, I show thereon in diagrammatic fashion the electrical circuit, of which the catalytic element 32 forms a part, for continuously indicating or recording the percentage of free oxygen or excess air in the sample gas flow. I have illustrated the analyzer arranged to visually exhibit by means of a movable index 36 cooperating with a time revoluble chart 37 and scale 38. The index, chart and scale are merely specific forms of exhibiting means which may take a wide variety of other forms, as will be evident to those skilled in the art. Certain features of the electrical circuit illustrated in connection with the present invention are disclosed and claimed in the copending application of John D. Ryder, Serial No. 424,281, now Patent 2,333,393.

To provide an accurate and sensitive measuring system I preferably employ the null or zero balance method wherein a variable effect of measurable value is maintained equal to or in some predetermined proportion to the electrical effect produced by the variable, and hence becomes a measure of the variable. In Fig. 2 I employ an alternating current Wheatstone bridge generally indicated at 39 and having as ratio arms the resistance 32 and an adjustable resistance 40. The resistance 40, which is moved in consonance with the index 36 by a reversible motor 41, is the balancing resistance and through means hereinafter described is continuously varied to maintain the Wheatstone bridge in balance, and hence the magnitude thereof becomes a measure of the resistance 32, and inferentially of the variable to which the latter is sensitive. The catalytic wire 32 forms a variable impedance whose electrical resistance varies with temperature as a result of catalytic combustion thereon.

The bridge 39 is supplied with alternating current through a voltage regulator 42 and the resistance 32 is normally heated to a temperature of 700° to 800° F. so that catalytic burning will start on the surface of the wire 32 when the elements of combustion are present. The output of the Wheatstone bridge 39 is put through a two-stage amplifier such as a double triode resistance coupled device 43 sensitive to polarity or phase of the current in the output conjugate conductor of the bridge 39 and for control of motor control tubes 44, 45. In the output circuit of the tubes 44, 45 are connected transformers 46, 47 selectively controlling the direction of rotation of the reversible motor 41.

In general, assuming a condition of equilibrium of the circuit, if the oxygen content of the sample gas deviates in one direction or the other, then the catalytic burning on the platinum catalyst 32 will increase or decrease, thereby causing a variation in electrical resistance to current flow through the bridge leg 32. This results in an unbalance of the bridge 39 in one direction or the other with a resulting change in polarity or phase in the output circuit of the bridge. Such change (from an equilibrium condition) in polarity or phase, acting through the amplifier 43, controls the tubes 44, 45 and thereby the transformers 46, 47 to cause rotation of the motor 41 in predetermined direction and for a time so long as the condition of unbalance exists. As soon as the motor 41 starts to rotate in predetermined direction it causes a positioning of the contact arm along the balancing resistance 40 in direction to restore the bridge 39 to balance. When this has been accomplished, then an equilibrium condition exists in the entire circuit and the motor 41 ceases to rotate until again the circuit becomes unbalanced. The new position of the contact arm along the balancing resistance 40 is representative of the new value of resistance 32, and thereby is representative of the new value of free oxygen or excess air in the sample gas stream. Simultaneously with positioning of the contact arm along the resistance 40 the motor 41 has moved the index 36 relative to the scale 38 and to the recording chart 37 so that a visual indication is continuously available of the percent of free oxygen or of the percent of excess air in the same gas. At the same time a chart record is made in desired units of measurement.

Referring to Fig. 5, I illustrate therein a modification of a portion of Fig. 1 used under certain operating conditions. For example, in certain instances it is desirable to continuously bias the operation of the analyzing cell by admitting thereto a constant predetermined amount of oxygen. If, for example, this bias oxygen (as atmospheric air) were the equivalent of 3% free oxygen, then the analyzer would indicate 3% free oxygen in the mixture passing through the exit channel 30 when, for example, the sample gas were pure nitrogen with no free oxygen entering through the duct 7. Such a biasing action is particularly desirable if the expected free oxygen content of the sample is very low, as for example, .1 or .2 of a percent of volume. Thus rather than having the chart record a minute distance above zero the record would be biased by say 3% constant input of oxygen, and the result would be as though the gas sample contained say 3.1% free oxygen rather than containing .1% oxygen. Thus the bridge action would be as though the sample contained 3.1% free oxygen but the chart and scale would be graduated to read correctly the oxygen content of the sample not including the bias oxygen.

I have found that when an extremely low percentage of free oxygen exists in the sample stream it is advisable to have bias air or oxygen so that there will always be a certain amount of oxygen combining with the vaporized fuel on the catalytic wire. The burning of vaporized liquid fuel usually results in considerable cracking or decomposition of such vapors with the possibility of a resultant poisoning of the catalyst unless a certain minimum percentage of free oxygen is available to combine with the fuel vapors. Thus, for example, it is usually advisable to have about 3% by volume bias air supplied.

In order to continuously supply to the mixing chamber 14 a uniform flow of bias air (representative of a uniform supply of free oxygen) I provide (referring to Fig. 5) a duct 48 entering the annulus 9 substantially opposite the entrance of the duct 7. The duct 48 leads from a pressure regulator 6A for regulation of the pressure, and thereby the rate of flow, of the atmospheric air. The air leaving the regulator 6A under pressure passes through the duct 48 and through a tiny orifice into the annulus 9. Ordinarily the amount of bias air desirable would amount to about 20% by volume of the sample gas flow entering the annulus 9 through the duct 7. However, the pressure of the bias air in the duct 48 must be substantially the same as that of the pressure of the sample in the duct 7, or else the bias air cannot enter the annulus 9 against the flow from the duct 7.

As a practical matter I have determined that the pressure of the sample flow in the pipe 5 arriving from the sampling and cleaning apparatus may vary from 3 inches of water to 5 pounds gage pressure. I have so proportioned and designed the regulator 6 that the pressure available in the duct 7 is readily held to a pressure of 1.6 plus or minus .01 inch of water through this variation in pressure in the pipe 5. The bias air is supplied to the regulator 6A from any available source of compressed air and may, for example, be at around 25 pounds per square inch gage pressure at the entrance to the regulator. The pressure at the exit of the regulator, however, in the duct 48, may be slightly higher than the pressure of 1.6 inches of water in the duct 7. The relatively small orifice exit of the duct 48 into the annulus 9 limits the rate of flow of bias air to approximately 20% by volume of the flow of gas sample from the duct.

In Fig. 6 I show a modified arrangement of the catalytic wire and method of diffusing the combustible mixture thereover. Therein the platinum wire 32A is spirally coiled to approximately ¼" O. D. and ½" to ¾" length. The coil 32A is supported at the top end by being fastened to an electrical lead post 33, and at the other end is fastened to a discharge conduit 31A which also forms a return electrical connection from the catalytic wire 32A.

In this arrangement the combustible mixture of sample gas and fuel passing upward under slight pressure through the pipe 31A exits to the interior of the coil 32A and it is believed that the arrangement provides a more certain contact of all of the combustible mixture with some portion of the heated catalytic wire 32A. Furthermore, the arrangement provides a better support for the catalytic wire and provides that the wire itself may be of considerably greater diameter. While the greater diameter dictates that more electrical current is necessary to heat the wire, at the same time I have found that the coil arrangement illustrated in Fig. 6 amplifies the self-heating of one portion of the wire to another and as a result the total electrical current necessary to heat the catalyst with no free oxygen being burned thereon is about the same as with the arrangement shown in Fig. 1. The many advantages of rigidity, strength, compactness of structure, and better diffusion of the combustible mixture over the catalyst however indicates that this is a preferred or desirable arrangement of the catalytic cell construction.

I will now describe more in detail the construction and operation of my improved pressure regulators 6 and 6A shown in connection with the sample flow in Fig. 1, in connection with the bias air supply in Fig. 5, and to enlarged and greater detail in Fig. 3.

Referring in particular to Fig. 3, it will be seen that the flow regulator 6 comprises preferably a metallic block 49, in which are two longitudinal bores 50 and 51 of approximately one-half inch diameter each. The bores 50 and 51 are roughly coned at the bottom and open into a short cylindrical passage closed at the lower end by removable screws 52. Positioned in the bores 50, 51 respectively are members 53, 54 comprising a long stem with a conical head near the upper end. It is to be noted that the assembly of Fig. 3 is approximately double scale to the construction which I preferably use. The members 53, 54 are shown as resting by gravity against the ends of the screws 52. In this position, and with no flow of gas under pressure entering the conduit 5, the periphery of the base of the conical section of the member 53 (or the member 54) is adjacent the lower end of a cross slot 55 or a cross slot 56 respectively. These cross slots are milled across the upper end of the assembly block 49 through the center of the bores 50 and 51. They are preferably of a different width, with the slot 55 being a greater width than the slot 56.

The gas sample flow arrives at the conduit 5 from the cleansing-sampling apparatus at a pressure which may vary from say 3 inches of water to 5 pounds gage. This sample flows into the bore 50 below the conical head of the member 53 and the resulting pressure built up in the bore 50 raises the member 53. In doing so a portion of the slot 55 at either side of the bore 50 is uncovered in varying degree by upward positioning of the conical head of the member 53. This allows a flow of the sample from the bore 50, below the conical head, to atmosphere through the two portions of the slot 55 at opposite sides of the bore 50. Depending upon the diameter of the conical head of the member 53 and also upon its total weight, as well as upon the width of the slot 55, the rate of flow and pressure of the sample entering the bore 50 through the pipe 5 will be decreased by the bleed to atmosphere through the slot 55 until a predetermined pressure is attained within the bore 50 in the space below the conical head of the member 53.

For best regulation I have found it desirable to have two such assemblies in series. Thus a passage 57 is provided from the bore 50 to the bore 51 below the conical head of the members 53, 54. The reduced pressure flow of the sample is effective through the passageway 57 to the interior of the bore 51 where it acts in turn upon the conical head of the member 54, positioning the member 54 vertically relative to the cross-slot 56 to a position dependent upon the weight and diameter of the conical section of member 54 and upon the width of the slot 56. Thus through proper design I am enabled to obtain a static pressure within the bore 51, and in the outlet duct 7 at a uniform pressure, for example, of 1.6" of water plus or minus .01. This when the pressure available in the conduit 5 varies from 3 inches of water to over 5 pounds gage pressure. I desirably accomplish this in two stages, as illustrated in Fig. 3, and as just described.

The cylindrical heads of the members 53, 54 have approximately .0015 to .0030 inch diameter clearance, or just enough to allow freedom of positioning of the members. In general, the weight design of the members individually is just enough to offset the pressure effective on the conical head of the member times the area of said head, and to result in the uncovering of approximately one-half of the vertical elevation of the slots 55 or 56.

When there is no pressure flow through the assembly 6 the members 53, 54 may rest by gravity upon the ends of the screws 52. The screws 52 may either or each have a minute axial hole providing a continuous tiny bleed of air to take to the atmosphere any dirt, moisture, or other foreign material which may be carried into the assembly 6 through the pipe 5.

It is essential that the pressure effective through the conduit passage 57 be representative only of the static pressure within the bore 50. I have found that if the conduit 5 enters on approximately the center line of the bore 50 the mushrooming flow will react to give an erroneous upward force on the conical head of the member 53. If the conduit 5 enters the bore 50 substantially tangentially to the periphery or wall of the bore, a vortex is created which adversely affects the vertical positioning of the member 53. Furthermore, the centrifugal force of the sample in vortex motion is such that the flow entering the communicating passage 57 is at a pressure the resultant of the static pressure within the bore 50 plus an impact or velocity pressure created by the centrifugal motion. By shaping the inlet conduit 5, as shown in detail in Fig. 8, i. e. to notch an outlet ahead of a closed end of the tube, and provide the possibility of rotating the conduit 5 prior to fastening it permanently in place. I have found that through this construction I am enabled to insert a short section of conduit 5, as shown in Fig. 3, apply the expected pressure flow to the outer end of the conduit 5, and by slowly rotating the conduit 5 obtain a position for the same wherein all impact or velocity effect of the sample entering the bore 50 through the tube 5 is eliminated. In making this test I remove the member 54, plug the bore 51 with a cork, and attach the duct 7 to a manometer. By slowly rotating the conduit 5 I can increase or decrease the pressure effective upon the manometer above and below a predetermined value. With the conduit 5 at the position neutral between such increase and decrease I am assured of a measurement of static pressure within the bore 50 uninfluenced by impact or velocity of flow.

A similar condition exists in connection with the flow through the passage 57 into the bore 51. Without taking special provision, I would encounter a vortex action and the centrifugal force effect would be added to the static pressure effect upon the fluid in the duct 7. To counteract this erroneous action I provide a screw 58 having a beveled inner end (refer to Fig. 7) and which is adjusted adjacent the opening of the passage 57 into the bore 51. The usual desirable adjustment is with the screw 58 assuming a position approximately as shown in Fig. 7. In this position the impact effect of the sample entering the bore 51 through the passage 57 is eliminated and the pressure effective in the duct 7 is the static pressure of the fluid within the bore 51. Having adjusted elements 5 and 58 during calibration of the unit they are then soldered permanently in place.

While I have illustrated and described certain preferred embodiments of my invention, it will be understood that these are by way of illustration only and that I am not to be limited thereto necessarily.

What I claim as new and desire to secure by Letters Patent of the United States is:

1. Apparatus for supplying a mixture of sample gas and vaporized fuel to a gas analyzer of the catalytic combustion type comprising, in combination, conduit means for supplying liquid fuel, means connected with one end of said conduit for delivering said fuel to said conduit under a predetermined head, an extended length of restricted capillary tubing communicating with the other end of said conduit, a metal block structure containing the capillary, heating means for the block and capillary, a mixing chamber in said block having a porous fuel vaporizing block therein with an extended surface, said capillary communicating with said mixture chamber, and conduit means communicating with said chamber for delivering sample gas to said vaporizer block.

2. A fuel supply and deaerating system for a gas analyzer comprising the combination with a conduit for supplying a volatile fuel, of means for maintaining a fixed liquid level in a chamber communicating with one end of said conduit, a cylinder wholly below the level maintained by said means, a standpipe extending through the liquid in said cylinder and opening into the liquid therein below the top of the cylinder, means connecting said standpipe to the other end of said conduit, a vent pipe open to the atmosphere and extending upwardly from the top of said cylinder to a point above the fuel level in said chamber, a metal block structure enclosing the cylinder, means to heat the block to raise the temperature of the fuel in the cylinder to near the boiling point to free entrained air, said vent pipe extending beyond the influence of the heated block, and discharge means for said fuel comprising an extended capillary pipe having its entrance adjacent the outlet of said standpipe and extending downwardly through the fuel in the cylinder in heat transferring relation thereto, the resistance to flow of the capillary at the head imposed by said first mentioned means being such as to restrict the fuel delivery to the desired amount and to maintain the level in the vent pipe substantially the same as that in said chamber.

3. In accessory equipment for a gas analyzer in combination, a metal body block in and on which the component parts of the equipment are mounted, heating means for the block, a conduit to deliver liquid fuel for the analyzer, a deaerator chamber within the block containing a standpipe open near the upper end of the chamber and connected at its lower end to the said conduit, the chamber being open to the atmosphere for freeing air liberated from the liquid fuel in the chamber by heat from the metal block, a liquid fuel vaporizer located in another chamber in said block, and a conduit connecting said vaporizer to said chamber outside of said standpipe.

4. The combination of claim 3 wherein the second conduit includes a liquid fuel flow control connected directly between the upper portion of the deaerator chamber and the vaporizer, said flow control comprising a relatively long small-bore capillary positioned to be immersed in the liquid in said deaerator chamber.

5. In accessory equipment for a gas analyzer in combination, a metallic mass comprising the support and container for the essential elements of the equipment, thermostatically controlled heating means maintaining the mass and equipment elements at a uniform temperature, a mixing chamber in said mass, a conduit to deliver liquid fuel into said chamber for the analyzer, a liquid fuel deaerator connected to said conduit and located within said mass, a liquid fuel vaporizer within the chamber, and liquid flow controlling means interconnecting the deaerator and vaporizer within the heated mass.

6. In a gas analyzer in combination, a heated metallic body member having a mixing chamber therein, a liquid fuel vaporizer entirely within said chamber, a conduit to deliver liquid fuel to the said analyzer, a fuel deaerator within the body member and connected to the liquid fuel conduit, a liquid flow controller within the body member connected between the deaerator and vaporizer, a conduit for conducting sample gas to the mixing chamber adjacent the vaporizer whereby the fuel vapor and sample gas are mixed, and an analyzing cell supported by said body member and connected to said mixing chamber to receive the mixture therefrom.

7. The combination of claim 6 including a flow controller interposed in the conducting means for the gas sample stream comprising a gas pressure regulator and a measuring orifice between the regulator and the mixing chamber.

8. A catalytic combustion cell for a gas analyzer comprising, a loosely coiled catalytic wire supported with the axis of the coil substantially vertical, a vertical electrical conductor with a laterally offset upper end extension to which one end of the coil is fastened and from which the coil is suspended, and a tube axially located below the center of the coil and to which the lower end of the coil is electrically connected, the tube forming a passage for a combustible mixture to within the catalytic wire coil.

9. Gas analyzing apparatus for continuously determining the percentage of free oxygen in a pressure sample flow of gas comprising, in combination, a catalytic analyzing cell including a heated catalytic wire, a mixing chamber having a conduit leading to said cell, conduit means communicating with said chamber for delivering a vaporizable liquid fuel thereto, means in said chamber to vaporize said fuel, conduit means communicating with said chamber for delivering sample gas thereto, conduit means communicating with said chamber for delivering air thereto to provide an oxygen bias, and common means to regulate the temperature of the materials flowing to and the mixture flowing from said chamber.

10. In a mixing device for the burner of a gas analyzer, a liquid fuel vaporizer comprising an elongated vertically positioned porous stone member, said member having an axial cavity in its lower end from the upper end of which cavity extend lateral passages to the exterior of the member, a supporting member for said porous stone having a tube portion normally extending into said cavity, said tube portion provided at the innermost point of projection within the cavity with an orifice restriction, a conduit arranged to deliver vaporizable liquid fuel to the lower exterior of said stone, a conduit for delivering a constant pressure supply of gas sample to be analyzed to the cavity in said stone, and heating means for the assembly.

CLARENCE JOHNSON.

REFERENCES CITED

The following references are of record in the file of this patent:

UNITED STATES PATENTS

| Number | Name | Date |
|---|---|---|
| 524,361 | Tilghman | Aug. 14, 1894 |
| 583,529 | Fowler | June 1, 1897 |
| 624,889 | Ashley | May 9, 1899 |
| 742,879 | Lawler | Nov. 3, 1903 |
| 1,180,786 | Munzinger | Apr. 25, 1916 |
| 1,305,170 | Ross | May 27, 1919 |
| 1,454,291 | Lehman | May 8, 1923 |
| 1,465,955 | Sturcke | Aug. 28, 1923 |
| 1,745,331 | Parker | Jan. 28, 1930 |
| 1,754,722 | Lucke | Apr. 15, 1930 |
| 1,825,830 | Sullivan | Oct. 6, 1931 |
| 1,861,877 | Quill | June 7, 1932 |
| 1,969,888 | Gibson | Aug. 14, 1934 |
| 2,015,882 | Brewer | Oct. 1, 1935 |
| 2,023,610 | Nettel | Dec. 10, 1935 |
| 2,122,070 | Quick | June 28, 1938 |
| 2,124,074 | Mayo | July 19, 1938 |
| 2,227,899 | Grubb | Jan. 7, 1941 |
| 2,237,558 | Hutton | Apr. 8, 1941 |
| 2,267,722 | Ericsson | Dec. 30, 1941 |
| 2,293,019 | Johnson | Aug. 11, 1942 |
| 2,329,459 | Dickey | Sept. 14, 1943 |
| 2,334,926 | Hines et al. | Nov. 23, 1943 |
| 2,363,478 | Boeke | Nov. 28, 1944 |

FOREIGN PATENTS

| Number | Country | Date |
|---|---|---|
| 404,591 | Great Britain | Jan. 18, 1934 |
| 425,604 | Great Britain | Mar. 13, 1935 |
| 457,777 | Great Britain | Dec. 4, 1936 |

OTHER REFERENCES

Hablutzel, "The Effect of Lead Oxides on the Oxidation of Hexane," thesis in Lib. of Calif. Inst. of Tech. (1933), pp. 17 and 18, and Fig. 4.